(12) United States Patent
DeMartino et al.

(10) Patent No.: US 10,619,926 B2
(45) Date of Patent: Apr. 14, 2020

(54) PROCESS FOR SINTERING MATERIAL

(71) Applicant: Corning Incorporated, Corning, NY (US)

(72) Inventors: Steven Edward DeMartino, Painted Post, NY (US); Daniel Warren Hawtof, Corning, NY (US); Archit Lal, Ithaca, NY (US); Xinghua Li, Horseheads, NY (US); Daniel L Maurey, Savona, NY (US); Kevin William Uhlig, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 379 days.

(21) Appl. No.: 15/725,909

(22) Filed: Oct. 5, 2017

(65) Prior Publication Data

US 2018/0100698 A1  Apr. 12, 2018

Related U.S. Application Data

(60) Provisional application No. 62/405,649, filed on Oct. 7, 2016.

(51) Int. Cl.
| | | |
|---|---|---|
| *F27B 21/00* | (2006.01) | |
| *B29C 41/12* | (2006.01) | |
| *B29C 41/46* | (2006.01) | |

(52) U.S. Cl.
CPC ............. *F27B 21/00* (2013.01); *B29C 41/12* (2013.01); *B29C 41/46* (2013.01)

(58) Field of Classification Search
CPC .... B22F 7/00; B22F 7/002; B22F 2003/1046; B22F 3/10; B22F 3/1055; B22F 3/11; B29C 64/153; B29C 41/12; B29C 41/46; B29C 41/26; F27B 21/00; F27B 21/006; C03C 3/06; C03C 2201/02; C03C 2201/3488; C03C 23/0025; C03B 19/1453; C03B 19/1492; C03B 19/1484; C03B 19/1469; C03B 19/1476; C03B 19/06; C03B 19/066; C03B 2201/03; B23K 26/00; B23K 26/02; B23K 26/0344; B23K 26/0853; B23K 26/0892; B23K 35/0244; B23K 35/3607

See application file for complete search history.

(56) References Cited

U.S. PATENT DOCUMENTS

| | | |
|---|---|---|
| 8,062,733 B2 | 11/2011 | Hawtof et al. |
| 8,863,552 B2 | 10/2014 | Borens et al. |
| 9,422,187 B1 | 8/2016 | Bankaitis et al. |
| 2014/0170012 A1 | 6/2014 | Delisle et al. |
| 2014/0342120 A1 | 11/2014 | Buellesfeld et al. |

FOREIGN PATENT DOCUMENTS

| | | |
|---|---|---|
| JP | 09286621 A | 11/1997 |
| KR | 10-2008-0069554 A | 7/2008 |
| WO | 2017165769 A1 | 9/2017 |

OTHER PUBLICATIONS

International Search Report and Written Opinion PCT/US2017/055523 dated Jan. 22, 2018.

*Primary Examiner* — Shawntina T Fuqua
(74) *Attorney, Agent, or Firm* — Russell S. Magaziner

(57) ABSTRACT

A method for processing material includes sintering a portion of a sheet of material at a location on the sheet, moving the sintering location along the sheet of material at a first rate, and pulling the sintered material away from the sintering location at a second rate that is greater than the first rate.

16 Claims, 5 Drawing Sheets

PROCESS FOR SINTERING MATERIAL

CROSS-REFERENCE TO RELATED APPLICATIONS

This application claims the benefit of priority of U.S. Provisional Application Ser. No. 62/405,649 filed on Oct. 7, 2016 the contents of which are relied upon and incorporated herein by reference in their entirety as if fully set forth below.

BACKGROUND

Aspects of this disclosure relate to sintering material, such as fused silica. While making sheets of fused silica, Applicants serendipitously discovered a new sintering process that provides a new, useful sintered material, as described below.

SUMMARY

Referring to FIG. 1, a manufacturing line with equipment 110 includes a deposition surface in the form of a rotating drum 112. Particles are deposited on the drum 112, such as fused silica soot produced via flame hydrolysis through a linear burner 114, to form a sheet 116 or blanket of the material. Applicants have found the sheet 116 holds together as the sheet 116 decouples from the drum 112, possibly because the particles are partially sintered and bonded to one another, such as during the deposition, which occurs at high temperature. Rollers 126 or other tensioning devices, coupled to sides of the sheet 116, tension the sheet 116 lengthwise and/or widthwise. Additional tensioning devices may be coupled to the sheet 116, such as above or below the rollers 126. A laser 118 or another heat source is used to sinter (e.g., fully sinter), at a sintering location S along the line, at least a portion 120 of the sheet 116, such as a center portion of the sheet 116, as shown in FIG. 1. When sintered, the sheet 116 goes from a porous and/or opaque to dense and/or transparent in some embodiments, such as with fused silica.

While experimenting with this equipment 110, Applicants directed lasers 130 to trim off un-sintered side portions 122 from the sintered portion 120 of the sheet 116. By un-sintered, Applicants mean that these portions 122 of the sheet 116 did not pass through the sintering location S that sinters the sintered portion 120; however, as mentioned above, the un-sintered portions 122 may have some partial sintering that holds the sheet 116 together; so, the term un-sintered is not to be read as completely un-sintered. Similarly, sintered need not be fully sintered unless so specified. Referring to FIG. 1, Applicants used lasers 130 directed to spots 124 proximate to the sintering location S to cut free vertical un-sintered sides 122 of the sheet 116, while the portion 120 was undergoing sintering from the laser 118.

As the sheet 116 moved past the sintering location S, the un-sintered sides 122 were disconnected from the sintered portion 120 of the sheet 116, below the cutting locations (spots 124). However, as a result of the cutting, the sintered portion 120 in the center was now generally free of tensioning provided by rollers 126 coupled to sides of the sheet 116 due to the disconnection. With the sintered portion 120 largely unrestrained, except for connection to the sheet 116 at the sintering location S, the sintered portion 120 fluttered in air currents of the setup, impacting the shape of the sintered sheet 120.

With intent of calming the flutter of the sintered portion 120, Applicants attached a binder clip to the bottom of the sintered portion 120. However, instead of holding the sintered portion 120 steady, to Applicants complete surprise the binder clip unexpectedly pulled the bottom edge of the sintered portion 120 quickly down to the floor, not breaking but instead stretching out the sintered portion 120 of the sheet 116 from the sintering location S. A long, almost ethereal strip of sintered material 120 was formed. Applicants stopped the manufacturing line and examined the resulting sintered material 120. The strip of sintered material 120 had a thickness on the order of 10 micrometers. Further, surface features typically present with prior versions of such processes (see, e.g., U.S. Pat. No. 8,062,733), such as striations due to soot deposition and/or lines from sintering, were apparently removed or reduced so as to be virtually undetectable upon visual inspection. A piece torn off from this almost ethereal strip of sintered material 120 is shown in FIG. 2A, crumpled from handling. A more pristine sample taped to white cardboard, shown in FIG. 2B, was subsequently produced.

Applicants realized that the above-described accidental discovery could be replicated in a controlled and purposeful manner as a sintering process for thin, high quality material.

Some embodiments disclosed herein relate to a method for processing material, which includes steps of sintering a portion of a sheet of material at a location on the sheet, moving the sintering location along the sheet of material at a first rate, and pulling the sintered material away from the sintering location at a second rate that is greater than the first rate. In some such embodiments, the sintering, moving, and pulling occur concurrently along a manufacturing line.

In some embodiments, the sintering location extends in a first direction across the sheet of material and the pulling is in a second direction generally orthogonal to the first direction. In some embodiments, the sheet of material includes silica soot. In some embodiments, the sheet of material, prior to the sintering, has a thickness that is at least 100 μm, and after the pulling, has a thickness less than 50 μm. In some embodiments, the sheet of material, prior to the sintering, is at least 20% porous by volume, while the sintered material is at least 95% fully densified. In some embodiments, porosity of the sheet of material is decreased, in terms of volume percentage, by at least 20% as the material is sintered at the sintering location.

Other embodiments disclosed herein relate to a thin sheet of fused silica, such as having a thickness less than 50 μm, where surface features formed into the sheet (e.g., bubbles, depressions, bowls, etc.), if present, have eccentricity in a common direction with one another. Put another way, defects and/or irregularities formed into the glass at sintering are stretched in a common direction such as due to pulling, as described above. In some such embodiments, the sheet is free of indicia of grinding, polishing, and etching. In some embodiments, the sheet has a major surface with an area of at least 175 cm². In some embodiments, the fused silica is at least 99.99 wt % pure, while in other embodiments it may be doped. Silica may be particularly benefited from processes disclosed herein, such as due to high melting temperature of silica, but in other contemplated embodiment, the sheet, as disclosed herein, is of material other than silica.

Still other embodiments disclosed herein relate to a line for manufacturing sintered material, where the line includes a sheet of material advancing along the line, a sintering location on the line where a portion of the sheet of material is sintered, and a sintered portion of the sheet of material is extending along the line from the sintering location. The sheet of material, prior to passing through the sintering location, is advancing along the line at a first rate; and the sintered portion is advancing along the line at a second rate that is greater than the first rate. In some such embodiments, the sintering location extends across the sheet of material, orthogonal to the direction that the sheet of material is advancing with respect to the sintering location. In some embodiments, the sheet of material is partially sintered prior to passing through the sintering location. In some embodiments, the sheet of material is at least 20% porous by volume prior to passing through the sintering location. In some embodiments, after passing through the sintering location, the sintered portion is at least 95% fully densified. In some embodiments, porosity of the sheet of material is decreased in terms of volume percentage at least 20% after passing through the sintering location. In some embodiments, the sheet of material comprises silica soot, such as the sintered portion comprising 99.99 wt % pure fused silica. In some embodiments, the line further includes a laser that heats the sintering location. In some embodiments, prior to passing through the sintering location, the sheet of material has a thickness that is at least 100 μm, but then less than 50 μm after passing through the sintering location.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
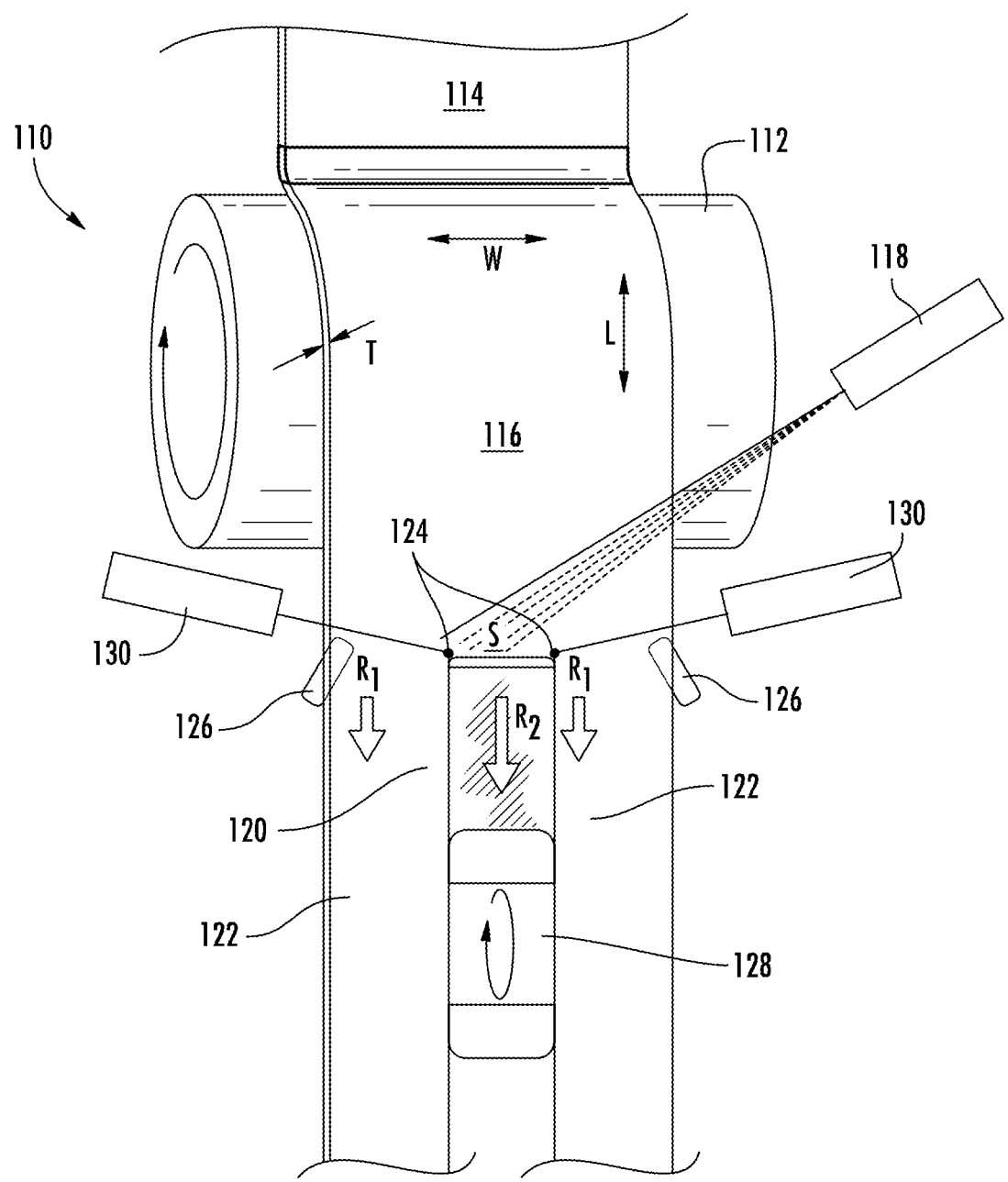
FIG. 1 is a conceptual schematic from a front perspective of equipment, according to an exemplary embodiment.

Further referring to FIG. 1, in some embodiments, the rollers 126 or other tensioning devices are aligned (e.g., horizontally aligned) with the sintering location S and one another. In some embodiments, the spots 124, cutting the sintered portion 120, are within 5 cm of the sintering location S, such as within 3 cm. Positioning the spots 124 too far below the sintering location S may allow the sintered portion 120 of the sheet 116 to solidify, limiting or preventing subsequent stretching. In other embodiments, other cutting devices are used to cut off the sides 122. In still other embodiments, the sintering location S extends fully across a sheet 116, and the sintered section 120 may be tensioned and advanced at a rate $R_2$ that is greater than the rate $R_1$ of the un-sintered sheet 116 above the sintering location S, such that the sintered portion 120 need not be cut and separated from un-sintered sides, as described above.

In some embodiments, a lower spool 128 tensions the sintered section 120 downstream of the sintering location S, advancing the sintered section 120 at a rate $R_2$ that is greater than the rate $R_1$ that the un-sintered portion of the sheet 116 is advancing. In other embodiments, the sintered portion 120 may be pulled by rollers, treads, belts, directed air, actuators, or other tensioning devices. As mentioned above, un-sintered is intended to denote the sheet 116 prior to or not passing through the sintering location S, which may be partially sintered as opposed to completely un-sintered. Likewise, sintered portion 120 is intended to denote portions of the sheet 116 that have advanced through the sintering location S.

According to an exemplary embodiment, thickness of the sintered portion 120 is measured live on the manufacturing line and provides feedback to drive a motor operating the lower spool 128, such as to adjust the speed of the spool and/or torque (force of pull) of the spool as a function of the thickness. In some such embodiments, the line may include a slip clutch for in line tensioning. In contemplated embodiments, the sintered portion 120 may be coated and/or joined with a polymeric carrier film prior to winding on the lower spool 128.

The material of the sheet 116 may be an inorganic material, such as a ceramic or glass. In some such embodiments, the material is more specifically a glass material, which may be amorphous glass or crystallized forms with such constituents, such as glass-ceramic having at least some crystallization. In some such embodiments, the material may more specifically be an amorphous glass material. In some such embodiments, the amorphous glass material may have a particularly high melting temperature, such as greater than 1300° C., for example. In some embodiments, the material may include doped or pure fused silica, such as having at least 70 weight percent $SiO_2$ as a constituent, such as at least 90 wt %, such as at least 99 wt %, such as an extremely high purity fused silica of at least 99.99 wt %. In particular applications, the sintered material may be layered with like or dissimilar materials.

Figure 3:
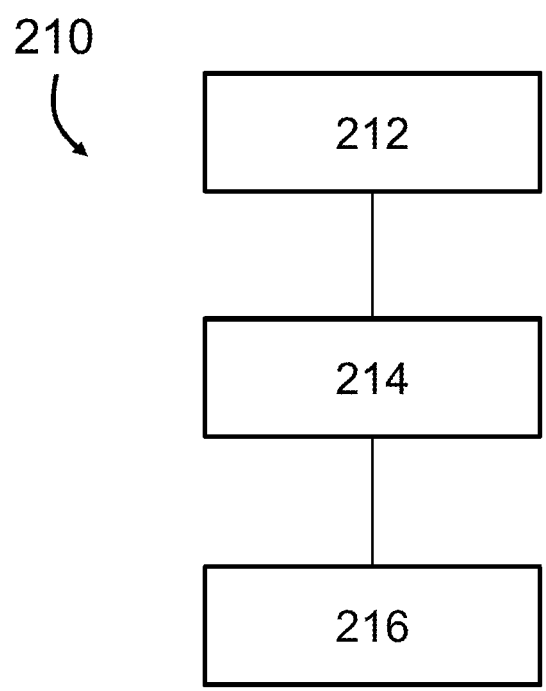
FIG. 3 is a flow diagram of a process, according to an exemplary embodiment.

Referring to FIG. 3, some embodiments relate to a process 210 for sintering material. According to an exemplary embodiment, a step 212 of the process 210 includes heating a section of the sheet 116 of the material to a temperature sufficient to sinter the material and/or lower viscosity of the material such that, for example, porosity of the material is decreased and the material of the sheet is densified and the material may be stretched. The heating step 212 may be performed by a laser, such as a $CO_2$ laser rapidly moving over the sintering location S in a pattern and/or shaped/distributed via optics, for example, or by a plasma torch, a furnace, flame, or other heating devices.

According to an exemplary embodiment, a step 214 of the process 210 includes advancing the position of the sintering location S along the sheet of material at a first rate $R_1$. For example, this step 214 of advancing may be due to movement of the sheet 116 past the focus of the laser 118 (or other heating device), by movement of the laser 118 relative to the sheet 116, a combination of moving the laser 118 and sheet 116, using multiple lasers in combination or succession, or otherwise. In the setup of FIG. 1, the rate R1 of the advancing step 214 is the rate at which the sheet 116 is produced and comes off the deposition substrate 112.

According to an exemplary embodiment, a step 216 of the process 210 includes pulling the heated material away from the sintering location S while the sintered material cools. According to an exemplary embodiment, the pulling is at a second rate $R_2$ that is greater than the first rate $R_1$. In some embodiments, the second rate $R_2$ is at least 1.25 times the first rate $R_1$ during at least a portion of the manufacturing, such as at least 1.5 times, at least 2 times, at least 4 times, at least 10 times. The difference in rates $R_1$, $R_2$ may correspond to thickness of the sintered material as well as the degree of surface features, where greater stretching of the sintered material may correspond with a smoother, more consistent surface of the sintered material when fully solidified and cooled, such as when cooled below the glass transition temperature.

According to an exemplary embodiment, steps 212, 214, 216 may be simultaneously and/or continuously performed during the process 210 of manufacturing of sintered sheets.

According to some exemplary embodiments, the heating is widthwise across the sheet of material and the pulling is lengthwise and/or generally away from and orthogonal to the sintering location S. Such a configuration may be present when the source of the heating is a laser, such as the laser 118, which heats the material in an elongate region.

According to some embodiments, the material of the sheet 116 is at least 10% porous by volume, such as at least 20% porous by volume, at least 30% porous by volume, at least 50% porous by volume, and/or no more than 95% porous by volume, such as no more than 90% porous by volume. In some embodiments, the material of the sheet 116 is at least partially sintered, whereby particles of the material are bonded to one another, holding the sheet 116 together. After passing through the sintering location S, the sintered material 120 is at least 75% fully densified by volume, such as at least 95% fully densified, such as at least 99% fully densified. In some such embodiments, porosity of the material is decreased in terms of volume percentage of the sheet 116, after passing the sintering location S, by at least 10%, such as by at least 30%, such as by at least 50% as the material of the sheet is densified.

By porous, Applicants mean that the material is not fully dense such that the material includes internal gaps (e.g., filled by air, vacuum, etc.), where porosity is the ratio of the volume of gaps in the material over the total volume of the material, which may be presented in units of 0 to 100%. For example a sheet of silica soot is typically a porous material. Such a sheet of material 116 need not be formed via flame hydrolysis. For example, tape casting may be used to manufacture a partially-sintered tape of inorganic material for sintering, such as by burning off binder material of green tape, as described in U.S. application Ser. No. 15/218,689, which is incorporated by reference herein in its entirety. In some contemplated embodiments, un-sintered material may be compacted or otherwise made to have zero porosity.

In some embodiments, the process 210 may further includes steps of decoupling sides and one end of a sintered portion 120 (e.g., lower end) from un-sintered portions 122 of the sheet 116, where the sintered portion 120 may only be connected to the rest of the sheet 116 by way of the sintering location S. The sintering location S may be heated to a temperature at or above the sintering temperature of the material of the sheet 116. Decoupling of the sides 122 of the sheet 116 may, in some embodiments, include cutting the sheet 116 on sides of the sintering location S via spots 124. In other embodiments, decoupling the sides of the sheet 116 may simply be accomplished by extending the sintering location S fully across the width of the sheet 116.

In some embodiments, the process 210 may further include a step of winding the sintered section on a spool 128, as shown in FIG. 1. In other embodiments, the process 210 may include cutting the sintered portion 120 into discrete sheets that may then be stacked and packaged. In still other embodiments, the process 210 may include laminating the sintered portion 120 with a polymer, such as backing that may facilitate handling of the sintered portion 120, and/or applying a coating to the sintered portion 120.

According to some such embodiments, the material is a sheet 116 of silica soot. In some embodiments, the silica soot may be highly pure silica; while in other embodiments, the silica may be doped, such as having less than 10 wt % of a dopant(s), such as titanium oxide, niobium oxide, copper, or other dopants. According to an exemplary embodiment, the material is at least 99.99 wt % fused silica.

According to an exemplary embodiment, the sheet 116 of un-sintered material has a thickness that is at least 100 μm, such as at least 400 μm; material at the sintering location S is thinner than the un-sintered material and has a thickness of less than 500 μm, such as less than 200 μm, and/or at least 80 μm; and the sintered portion 120, after solidifying following the pulling step, is thinner than the material at the sintering location S, prior to the pulling, and has a thickness less than 50 μm, such as less than 30 μm, such as less than 20 μm, and/or at least twice the thickness of a monolayer of silica molecules. In other embodiments, thickness after the pulling is greater than 50 μm and/or less than 500 μm, such as less than 300 μm, such as less than 100 μm.

Figure 2A:
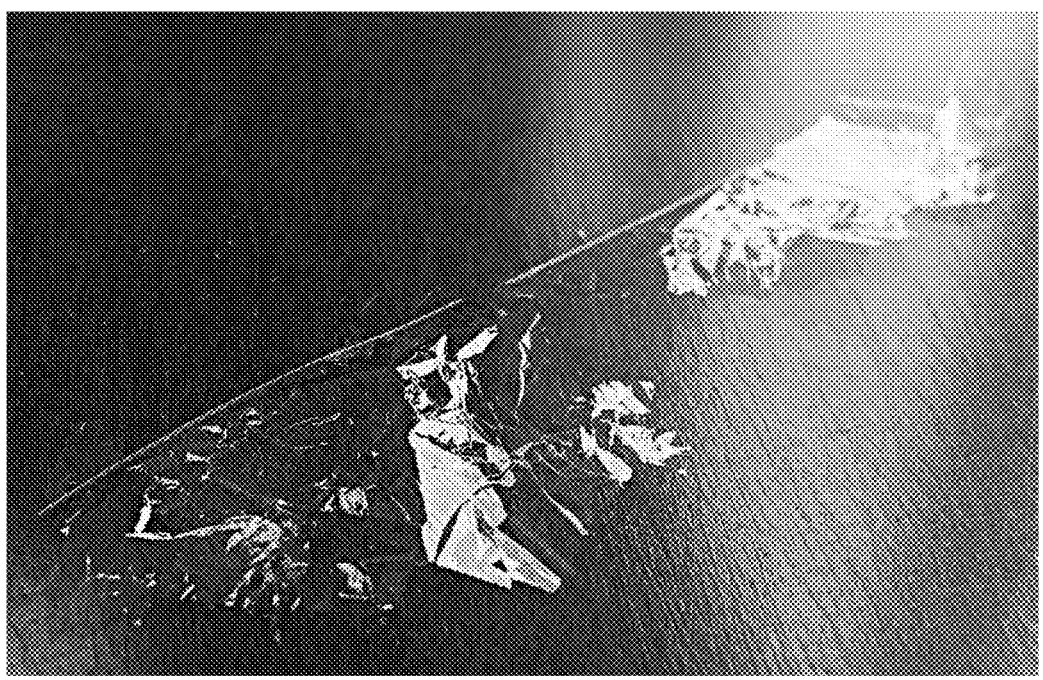
FIG. 2A is a digital image from above of sintered material, according to an exemplary embodiment.
Figure 2B:
FIG. 2B is a digital image from above of more sintered material, according to an exemplary embodiment.

Referring once more to FIGS. 2A-2B, some embodiments include a sintered sheet of material, such as fused silica, as may be formed with the above-summarized processes. In some embodiments, the silica sheet has a thickness less than 50 μm, such as less than 30 μm, such as less than 20 μm, such as less than 15 μm, such as less than 10 μm, and/or as at least twice the thickness of a monolayer of silica molecules. Such thicknesses are particularly significant given that in some embodiments the sheet has a width of at least 1 cm, such as at least 2 cm, such as at least 4 cm, and/or a length of a least at least 1 cm, such as at least 2 cm, such as at least 1 m, such as at least 10 m when rolled on a spool. In some embodiments, the sheet has a major surface (e.g., top side, bottom side) with an area of at least 100 $cm^2$, such as at least 150 $cm^2$, such as at least 175 $cm^2$, which may be particularly difficult to achieve at such thicknesses by other contemplated manufacturing processes due to fragility at associated thicknesses described above, such as at least 250 $cm^2$. For reference, the sheet corresponding to the material of FIG. 2A had a width of about 125 mm and were about 1 meter long.

Silica has a high melting temperature, is generally inert and resistant to chemicals, and has excellent dielectric and optical properties. Thin strips of high purity fused silica with smooth, even surfaces, may be used for cover material of flexible display devices, as a barrier film or layer, and/or as an interposer or semiconductor substrate, for example. Unfortunately conventional processes to make thin silica sheets can be costly and may render the sheets unusable due to surface contamination or roughness. For example, conventional processes for manufacturing thin sheets of silica, which may not be as thin as presently disclosed, may cut slices of silica from a boule and grind and polish the slices to thin sheets. But, these processes may be limited in geometry, unable to produce rolls as described above and possibly unable to achieve the extreme thin geometries as taught herein. Further, grinding, polishing, and etching typically leave indicia of such processes, that may be detected by those skilled in the art, such as corresponding surface microstructure, such as abrasion marks, and chemical residue on or near the surface of a material of the polishing and etching agents. Conversely, in some embodiments of the present disclosure, the sheet is free of indicia of polishing and/or indicia of etching, because grinding, polishing, and etching may be unnecessary to manufacture the sintered sheets of material as disclosed herein.

Figure 4:
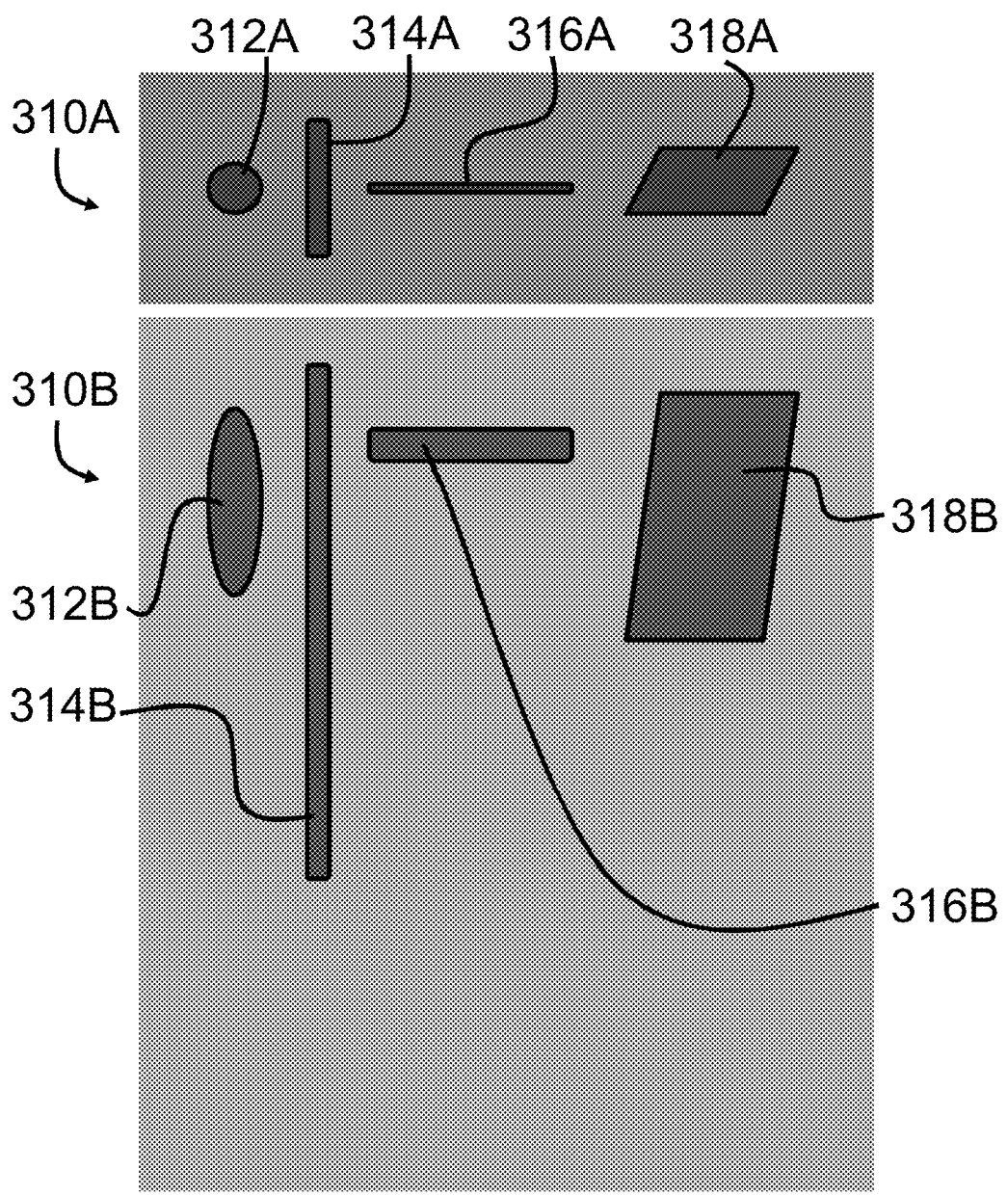
FIG. 4 is conceptual rendering of a sheet with surface features before and after pulling the sheet during a sintering process, according to an exemplary embodiment.

Referring now to FIG. 4, according to an exemplary embodiment, surface features 312A, 314A, 316A, 318A (e.g., small bubbles, depressions, open bowl-shaped cavities, ridges, valleys, striations, etc.), if present, formed into a sintered material 310A in a molten state, have eccentricity in a common direction of the surface features 312B, 314B, 316B, 318B after the sintered material 310B is pulled and stretched as described above. Put another way, defects or irregularities formed into the glass material during sintering are stretched consistently in the direction of the pulling. Round air bubbles, etc. become elliptical with major axes in the same direction as one another. Striations are stretched. The stretching may also redistribute depth of the respective surface features, which may essentially erase the surface features if the material is sufficiently stretched; where, if the surface features are present, the surface features are within design specifications for uses described above and/or are not detectable upon visual inspection.

As used herein, sheet is intended to mean a piece of material that has a length L, width W, and thickness T, where the thickness T is substantially less than the width W and length L, as shown in FIG. 1 for example. Tapes and ribbons are sheets, and when segmented into smaller pieces are still typically sheets. At least some sheets in the present disclosure may have a thickness T that is less than a fifth of the width W and/or length L, such as less than a tenth. Portions of a sheet may vary in thickness T, width W, and length L, such as by up to 50%.

Although the equipment in FIG. 1 is shown in a vertical arrangement and the present disclosure references directions associated with such a configuration, such as lower, horizontal, vertical, etc., Applicants contemplate that the equipment and process may be otherwise oriented and do not intend the disclosure to be limited to the specific directions provide, which are meant to be exemplary directions for a given setup. With that said, relationships between the exemplary directions are intended to be consistent in different orientations, such as vertical being generally orthogonal to horizontal, lower being on an opposing side from upper, etc.

The term manufacturing line is not intended to denote that the equipment or operations on the manufacturing line occur along a geometric line. Manufacturing line means equipment and/or operations that facilitate a manufacturing process.

While the particles of un-sintered material of the sheet 116 are described as soot, the present technology is intended to encompass sheets 116 of particles of inorganic materials other than silica, such as a sheet of ceramic particles (e.g., alumina, yttria-stabilized zirconia) or other particles of glasses (e.g., aluminosilicate), where the particles need not be deposited via a flame.

The construction and arrangements of the material and methods in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, in some embodiments the un-sintered sheet 116 extends to the outside edge of the deposition substrate 112. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A method for processing material, comprising:
    sintering a portion of a sheet of material at a location on the sheet;
    moving the sintering location along the sheet of material at a first rate; and
    pulling the sintered material away from the sintering location at a second rate that is greater than the first rate.

2. The process of claim 1, wherein the sintering, moving, and pulling steps occur concurrently along a manufacturing line.

3. The process of claim 1, wherein the sintering location extends in a first direction across the sheet of material and the pulling is in a second direction generally orthogonal to the first direction.

4. The process of claim 1, wherein the sheet of material comprises silica soot, wherein in the sheet of material prior to the sintering has a thickness that is at least 100 µm, and wherein the sintered material, after the pulling, has a thickness less than 50 µm.

5. The process of claim 1, wherein the sheet of material prior to the sintering is at least 20% porous by volume, while the sintered material is at least 95% fully densified.

6. The process of claim 1, wherein porosity of the sheet of material is decreased in terms of volume percentage by at least 20% as the material is sintered at the sintering location.

7. A line for manufacturing sintered material, comprising:
    a sheet of material advancing along the line;
    a sintering location on the line where a portion of the sheet of material is sintered, wherein the sheet of material, prior to passing through the sintering location, is advancing along the line at a first rate; and
    a sintered portion extending along the line from the sintering location, wherein the sintered portion is advancing along the line at a second rate that is greater than the first rate.

8. The line of claim 7, wherein the sintering location extends across the sheet of material, orthogonal to the direction that the sheet of material is advancing.

9. The line of claim 7, wherein the sheet of material is partially sintered prior to passing through the sintering location.

10. The line of claim 9, wherein the sheet of material is at least 20% porous by volume prior to passing through the sintering location.

11. The line of claim 10, wherein, after passing through the sintering location, the sintered portion is at least 95% fully densified.

12. The line of claim 10, wherein porosity of the sheet of material is decreased in terms of volume percentage at least 20% after passing through the sintering location.

13. The line of claim 7, wherein the sheet of material comprises silica soot.

14. The line of claim 13, wherein the sintered portion comprises 99.99 wt % pure fused silica.

15. The line of claim 7, further comprising a laser that heats the sintering location.

16. The line of claim 7, wherein prior to passing through the sintering location the sheet of material has a thickness that is at least 100 μm, and wherein the sintered material has a thickness less than 50 μm after passing through the sintering location.

* * * * *